(12) United States Patent
Yasunaga (10) Patent No.: US 7,594,804 B2
(45) Date of Patent: Sep. 29, 2009

(54) TIRE CURING FORMING MOLD

(75) Inventor: Toshikazu Yasunaga, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/126,350

(22) Filed: May 23, 2008

(65) Prior Publication Data
US 2008/0305196 A1 Dec. 11, 2008

(30) Foreign Application Priority Data
Jun. 6, 2007 (JP) ............... 2007-150580

(51) Int. Cl.
*B29C 35/02* (2006.01)
(52) U.S. Cl. ...................................... 425/46
(58) Field of Classification Search .................... 425/46
See application file for complete search history.

(56) References Cited

U.S. PATENT DOCUMENTS 3,479,693 A * 11/1969 Cantarutti ................. 425/46
4,411,175 A * 10/1983 Takahashi et al. .......... 76/107.1
5,204,036 A * 4/1993 MacMillan ................. 425/46
5,234,326 A * 8/1993 Galli et al. ................. 425/46
5,290,163 A 3/1994 Katsumata et al.
6,382,943 B1 * 5/2002 Metz et al. ................. 425/46
2002/0119209 A1 * 8/2002 Tanaka ....................... 425/46

FOREIGN PATENT DOCUMENTS

JP 1029686 1/1989
JP 04-341806 11/1992
JP 2005-178121 7/2005

\* cited by examiner

*Primary Examiner*—James Mackey
(74) *Attorney, Agent, or Firm*—Fish & Richardson P.C.

(57) ABSTRACT

In a tire curing forming mold in which an annular mold portion brought into contact with a tread portion of a tire is constructed by sectors divided in a tire circumferential direction, an end portion of the sector is constructed by a piece attachable to and detachable from a sector main body, and the piece is structured to include all ridge lines between an end surface of the sector and a tread forming surface provided on an inner peripheral side of the annular mold portion.

4 Claims, 7 Drawing Sheets

(a) MOLD RELEASED STATE   (b) MOLD CLAMPED STATE

TIRE CURING FORMING MOLD

BACKGROUND OF THE INVENTION

1. Field of the Invention

The present invention relates to a tire curing forming mold in which an annular mold portion brought into contact with a tread portion of a tire is structured by sectors which are divided in a tire circumferential direction.

2. Description of the Related Art

A tire curing forming mold (hereinafter, there is a case of being simply referred to as a forming mold) is structured by combining a plurality of mold portions, and is broadly classified into a two-piece type and a segmented type on the basis of a divided aspect. A portion brought into contact with a tread portion of a tire in the forming mold is divided in a tire width direction in the two-piece type, however, is divided in a tire circumferential direction in the segmented type. Due to a difference of the structure, the segmented type is more excellent in a mold releasing characteristic of the tire.

Figure 10:
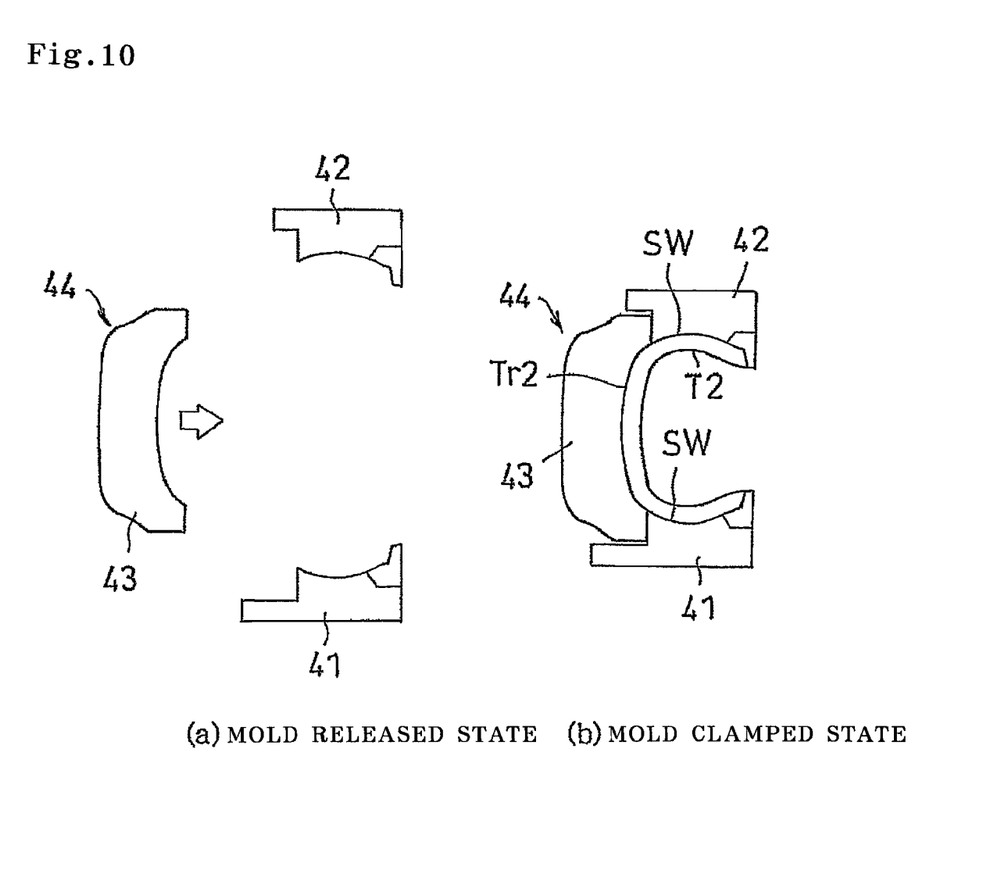
FIG. 10 is a vertical cross sectional view schematically showing a segmented type forming mold.

FIG. 10 is a vertical cross sectional view schematically showing one example of the segmented type forming mold. This forming mold is provided with a lower mold portion 41 and an upper mold portion 42 which are brought into contact with a side wall portion SW of a tire T2, and an annular mold portion 44 which is brought into contact with a tread portion Tr2. The annular mold portion 44 is constituted by a combination of a plurality of sectors 43 which are divided in a tire circumferential direction, and a concavo-convex shape corresponding to a tread pattern is provided in a tread forming surface provided on an inner peripheral side thereof. Each of the sectors 43 is structured to be displaceable in a tire diametrical direction, and each of the sectors 43 displaces to an inner side in the tire diametrical direction at a time of giving way to a mold clamped state from a mold released state, thereby bringing end surfaces into pressure contact with each other so as to be connected annularly.

In this case, in the segmented type forming mold, since each of the sectors brings the end surface into pressure contact with each other each time of the transition motion to the mold clamped state, the end surface of the sector tends to be worn out early by repeating an opening and closing motion. This tendency is significant particularly in a case where the sectors are made of a comparatively soft material such as an aluminum material or the like. Further, if the attrition of the end surface of the sector makes progress, a contact characteristic between the sectors is lowered, and a gap is provided in the divided surfaces. Accordingly, there is a case that a rubber burr called as a flash is generated in the tread surface of the tire.

Since this flash not only deteriorates an outer appearance of the tire, but also deteriorates uniformity and lowers drainage property in a groove portion, it is necessary to remove the flash, however, the removing work is very complicated because of a manual work. Further, at a time of repairing the end surface of the attrited sector, it is necessary to carry out a weld overlay to the attrited portion, so that there is generated a problem that a man hour and a cost are increased. Further, since the tire can not be cured during the repairing period, it is actually hard to immediately repair the sector even if the flash generation is confirmed. Particularly, in a case of making an expert maker a request of repairing the end surface of the sector, there is a case that an awaiting repair status is generated by a free condition of the maker, a capacity and the like, and there is a case that the complicated work is forced for a long period.

Japanese Unexamined Patent Publication No. 1-29686, Japanese Unexamined Patent Publication No. 4-341806, and Japanese Unexamined Patent Publication No. 2005-178121 describe a tire curing forming mold in which an annular mold portion is constituted by sectors which are divided in a tire circumferential direction, however, none of them discloses a countermeasure technique of the attrition on the end surface of the sector as mentioned above.

SUMMARY OF THE INVENTION

The present invention is made by taking the actual conditions mentioned above into consideration, and an object of the present invention is to provide a tire curing forming mold which can easily and quickly cope with attrition on an end surface of a sector to prevent a flash from being generated.

The object can be achieved by the following present invention. That is, the present invention provides a tire curing forming mold in which an annular mold portion brought in to contact with a tread portion of a tire is constructed by sectors divided in a tire circumferential direction, wherein an end portion of the sector is constructed by a piece attachable to and detachable from a sector main body, and the piece includes all ridge lines between an end surface of the sector and a tread forming surface provided on an inner peripheral side of the sector.

In accordance with the structure mentioned above, since the end portion of the sector is structured by the piece including all the ridge lines between the end surface of the sector and the tread forming surface, in a case where the end surface of the sector is worn out and there is a risk that the flash is generated, it is possible to easily and quickly cope with the risk by replacing the piece. As a result, it is possible to set the end surface of the sector to a suitable state in the field in which the tire is cured without asking for the repairing maker, and it is possible to efficiently form the tire in which the outer appearance and the uniformity are excellent.

Further, another present invention provides a tire curing forming mold in which an annular mold portion brought into contact with a tread portion of a tire is constructed by sectors divided in a tire circumferential direction, wherein each of end portions of a pair of adjacent sectors is constructed by a piece attachable to and detachable from a sector main body, division surfaces of the pair of the sectors are formed by a curved surface, and the piece includes all ridge lines between an end surface of the sector and a tread forming surface provided on an inner peripheral side of the sector.

Also in the structure mentioned above, it is possible to achieve the operation and effect mentioned above, that is, in a case where there is a risk that the end surface of the sector is worn out and the flash is generated, it is possible to easily and quickly cope with the risk by replacing the piece. Further, in the structure mentioned above in accordance with the present invention, there is an advantage that it is possible to simplify the division of the sector into the curved surfaces. In other words, in accordance with the present invention, since the interface of a pair of adjacent pieces constructs the division surface of the sector, it is possible to apply curved surface division by setting the light and thin piece in comparison with the heavy sector to a subject to be processed, whereby it becomes easy to handle and a workability is improved.

DETAILED DESCRIPTION OF THE PREFERRED EMBODIMENTS

Figure 1:
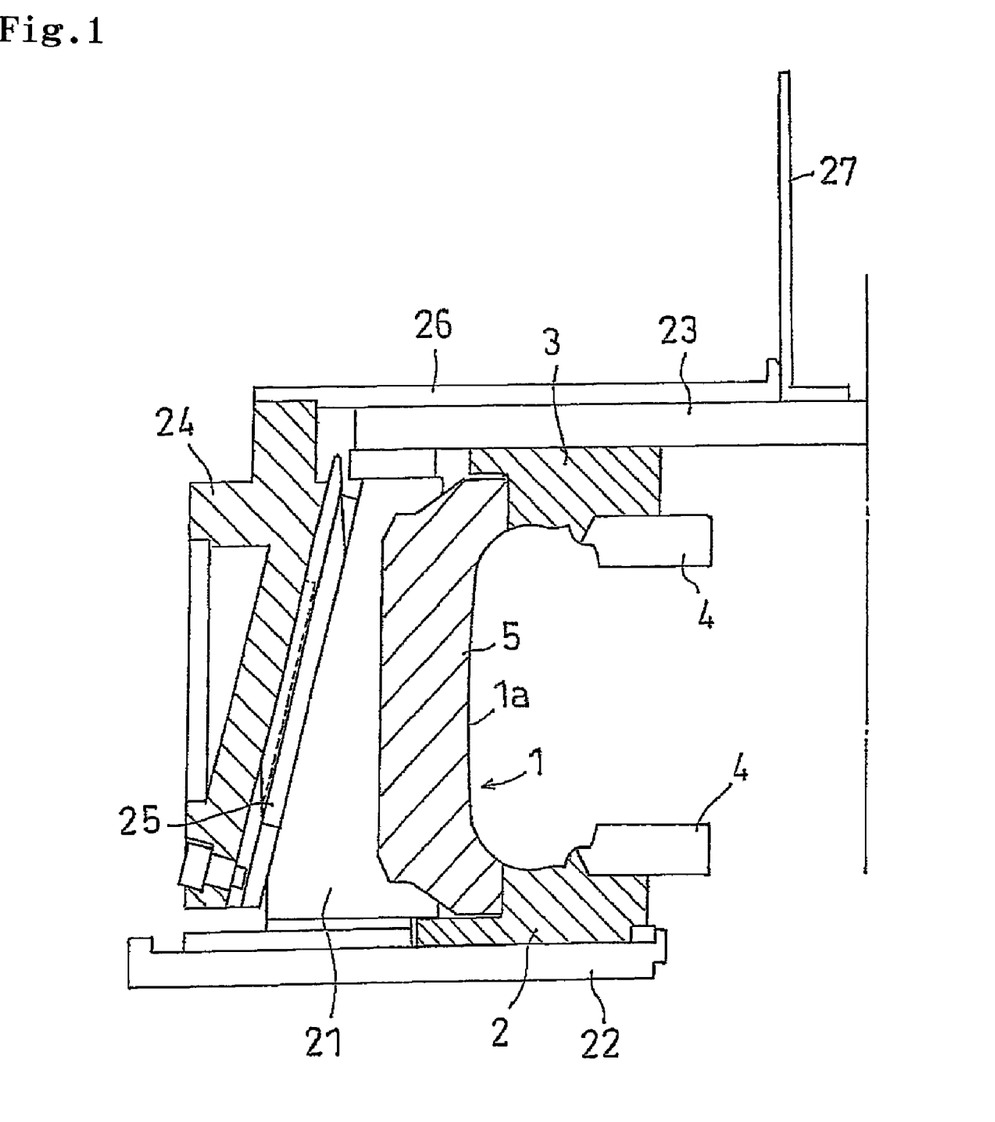
FIG. 1 is a vertical cross sectional view showing an example of a tire curing forming mold in accordance with the present invention.
Figure 2:
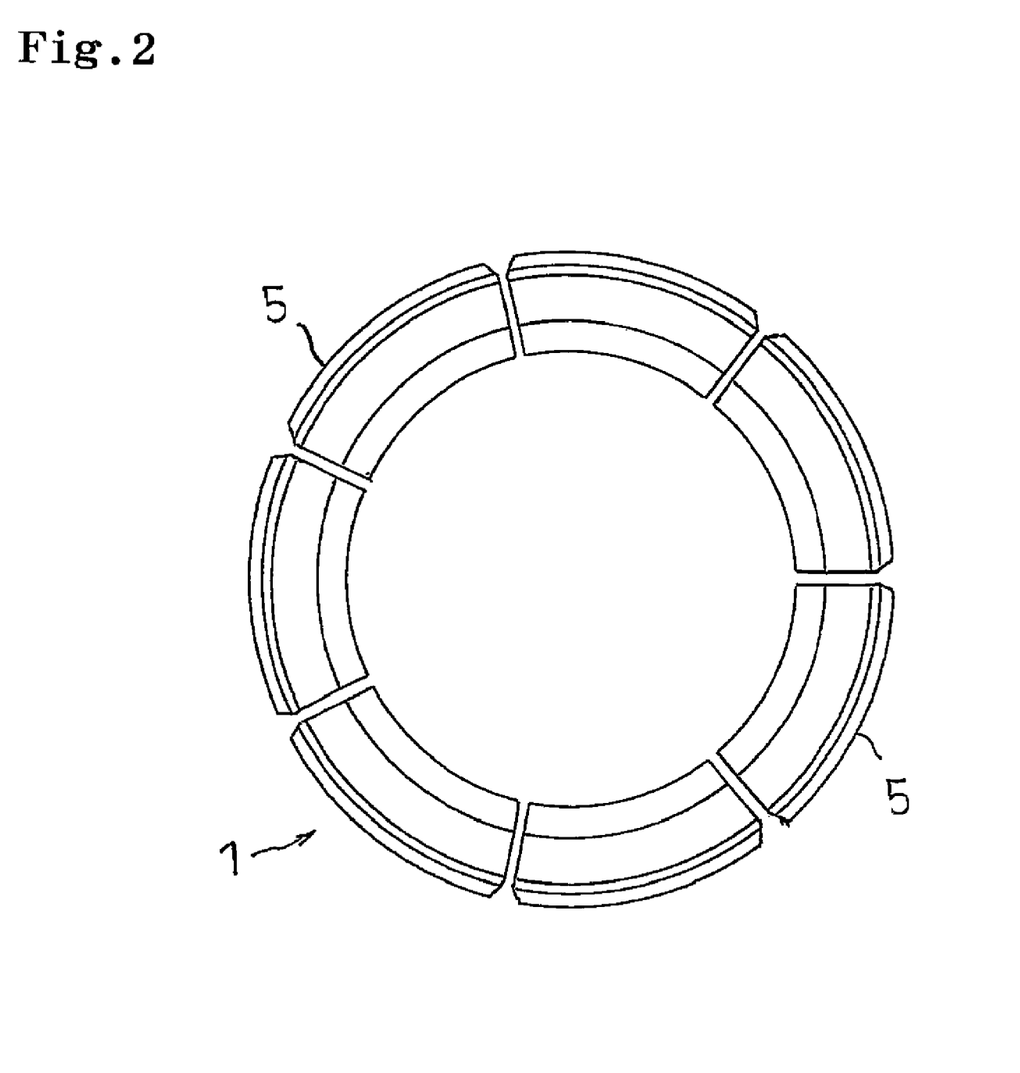
FIG. 2 is a plan view of an annular mold portion.

An embodiment of the present invention will be explained with reference to the drawings. FIG. 1 is a vertical cross sectional view schematically showing an example of a tire curing forming mold in accordance with the present invention, and shows a mold clamping state. In the drawing, a green tire (not shown) is set in such a manner that a tire axial direction is arranged up and down. In other words, a vertical direction in FIG. 1 corresponds to a tire width direction, a right direction corresponds to an inner side in a tire diametrical direction, and a left direction corresponds to an outer side in the tire diametrical direction. FIG. 2 is a plan view of an annular mold portion provided in the tire curing forming metal mold.

The tire curing forming mold is a segmented mold provided with an annular mold portion 1 with which a tread portion of a tire is brought into contact, a lower mold portion 2 with which a side wall portion in a lower side is brought into contact, and an upper mold portion 3 with which a side wall portion in an upper side is brought into contact. A bead ring 4 is provided in an inner side in the tire diametrical direction of the lower mold portion 2 and the upper mold portion 3, and the structure is made such that a bead core of the tire can be fitted.

Figure 5:
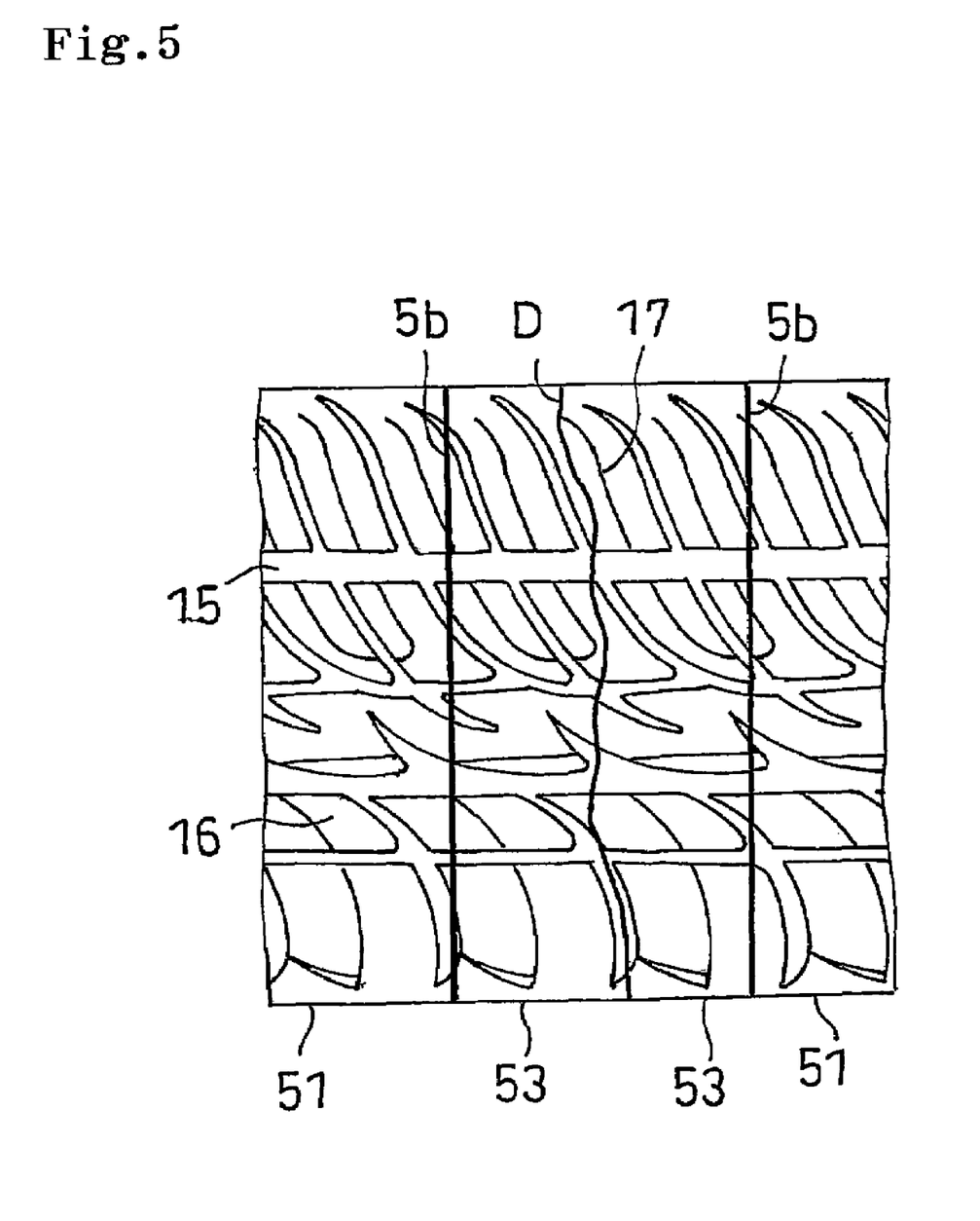
FIG. 5 is an expansion plan view showing a tread forming surface in accordance with another embodiment of the present invention.

The annular mold portion 1 is constituted by sectors 5 which are divided in a tire circumferential direction as shown in FIG. 2. Each of the sectors 5 is away from each other radially in a mold released state, however, gets together so as to be connected in an annular shape in a mold clamped state. A tread forming surface 1a provided on an inner peripheral side of each of the sectors 5 is provide with a concavo-convex shape including a frame portion for forming a groove portion, and a concave portion for forming a land portion comparted by the frame portion, as shown in FIG. 5 mentioned below. In the present embodiment, there is shown an example in which the annular mold portion 1 is divided into seven sections and circumferential lengths of the sectors 5 are approximately identical, however, in the present invention, the dividing number of the annular mold portion 1 is not particularly limited, but the circumferential lengths of the sectors 5 may be different from each other.

As shown in FIG. 1, the annular mold portion 1 is attached to a side surface of a segment 21, the lower mold portion 2 is attached to an upper surface of a plate 22, and the upper mold portion 3 is attached to a lower surface of a plate 23, respectively. The segment 21 is provided per sector 5, and is attached to the lower surface of the plate 23 structured such as to be movable up and down, so as to be slidable along a tire diametrical direction. A sliding rail 25 is provided on a slant surface in an outer side in the tire diametrical direction of the segment 21, and a cone ring 24 is fitted so as to be slidable along a tilting direction. The cone ring 24 is supported from the above to a platen (not shown) which can be moved up and down relative to the plate 23. There are also shown air seal plates 26 and 27.

In accordance with the structure mentioned above, it is possible to move up the cone ring 24 and move the segment 21 to the outer side in the tire diametrical direction by moving up a platen from the state shown in FIG. 1, so as to take off each of the sectors 5 from the lower mold portion 2 and the upper mold portion 3, and it is possible to take off the sector 5 and the upper mold portion 3 from the lower mold portion 2 by moving up the plate 23 and the segment 21 so as to change to the mold open state. The change from the mold open state to the mold clamp state may be obtained by carrying out the motion mentioned above in reverse. In the mold clamped state, the end surfaces 5a of the sectors 5 are brought into pressure contact with one another so as to be connected annularly.

Figure 3:
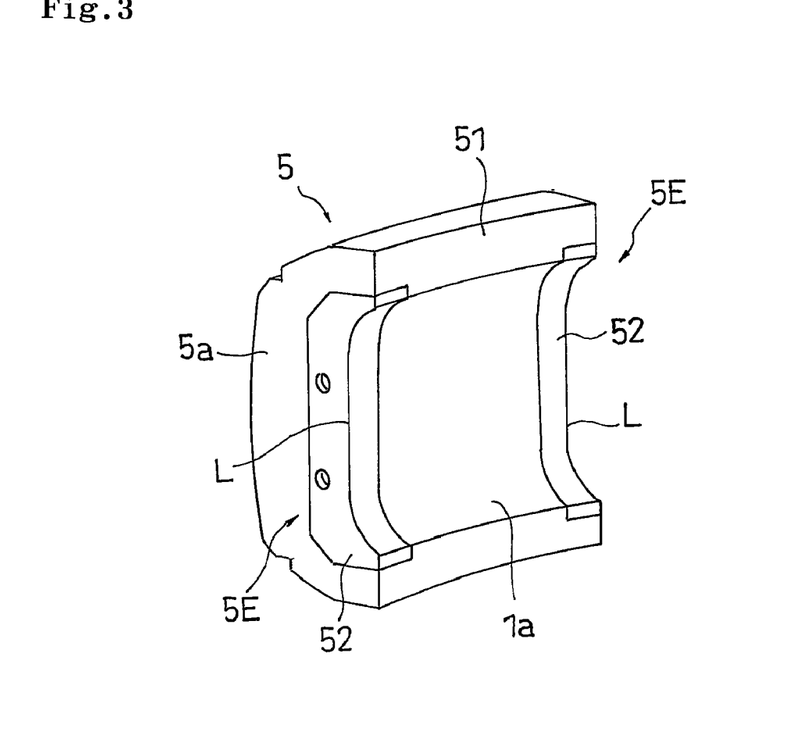
FIG. 3 is a perspective view of a sector.
Figure 4:
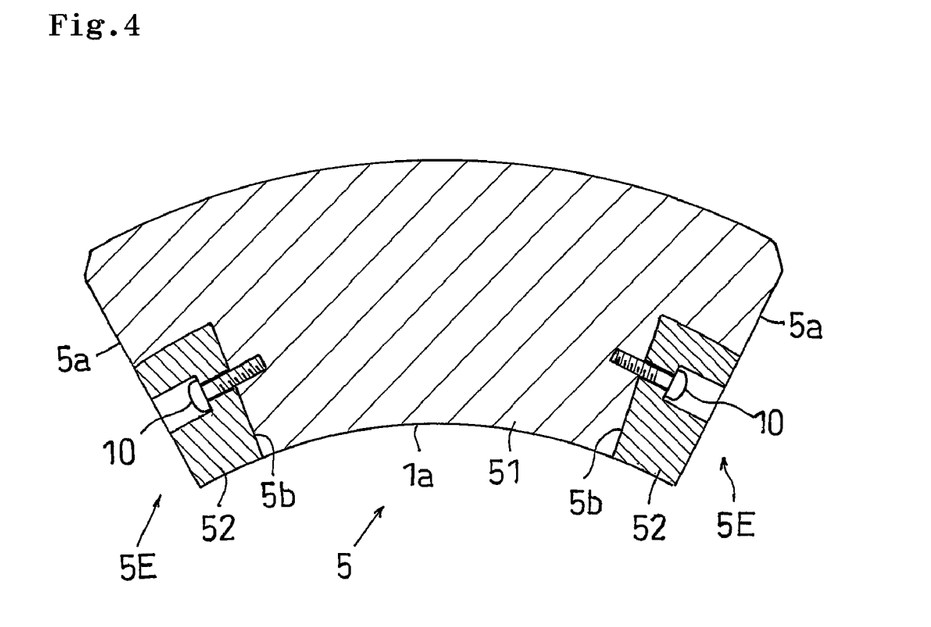
FIG. 4 is a cross sectional view of the sector.

Both end portions 5E of the sector 5 are constituted by pieces 52 which can be attached to and detached from the sector main body 51 as shown in FIGS. 3 and 4. Each of the pieces 52 is fitted to a concave portion provided in the end portion 5E of the sector main body 51, and is fixed to the sector main body 51 in a closely contacted state by a pair of bolts 10. The piece 52 constructs a portion including all ridge lines L between the end surface 5a of the sector 5 and the tread forming surface 1a, in the end portions 5E of the sector 5, and constructs at least an inner peripheral side portion of the end surface 5a and an outer portion in a circumferential direction of the tread forming surface 1a. In this case, the piece may wholly include the end surface of the sector.

In this forming mold, in a case where there is a risk that the end surface 5a of the sector 5 is worn out and the flash is generated at a time of carrying out the tire curing forming, it is possible to easily and quickly cope with the risk by replacing the piece 52. In other words, it is possible to prevent the flash from being generated, only by detaching the attrited piece 52 and installing the other normal piece 52 to the sector main body 51. Since the replacement of the piece 52 mentioned above is a very simple work, it is possible to suitably and quickly carry out in the field in which the curing forming of the tire is carried out, without making the expert repairing maker a request. Further, the curing forming of the tire can be executed without any problem even during a while the weld overlay or the like is applied to the attrition portion with respect to the detached piece 52, and the deterioration of the tire outer appearance and the uniformity is not caused by the flash.

In the present invention, it is preferable that the piece structure mentioned above is employed in both the end portions 5E of all the sectors 5, whereby it is possible to securely prevent the flash from being generated. Although an illustration is not provided, the concavo-convex shape corresponding to the tread pattern is provided in the tread forming surface 1a provided on the inner peripheral side of each of the sectors 5. The inner peripheral surface of the sector main body 51 is integrally formed, and the inner peripheral surface of the piece 52 is formed such that the concavo-convex shape are connected for the inner peripheral surface of the sector main body 51.

In the present embodiment, since the piece 52 is fixed to the sector main body 51 in the closely contact state, the attrition in the interface 5b between the sector main body 51 and the piece 52 is not generated even by repeating the opening and closing motion of the forming mold. On the contrary, for example, in a case where a falling of the piece 52 is only prevented by setting a stopper or the like in the end surface 5a of the sector 5, there is a risk that the interface 5b is worn out. As mentioned above, in the present embodiment, the risk of the attrition is done away in the sector main body 51 side of the piece 52, and it is possible to cope with only the attrition in the opposite side by replacing the piece 52.

The size of the piece 52 is not particularly limited, however, it is preferable that the piece 52 is enough light and thin to improve a workability or the like at a time of replacing. As a length in the circumferential direction of each of the pieces 52, there is exemplified a length which is 6 to 25% of the length in the circumferential direction of the sector 5.

As a raw material of the sector 5, it is possible to employ a raw material which is employed in the normal tire curing forming mold, such as a steel material, an aluminum material or the like without being limited. Further, the sector main body 51 and the piece 52 are not limited to the same material, but may be structured by different materials from each other. For example, the piece 52 may be structured by the steel material which is excellent in an attrition resistance, while structuring the sector main body 51 by the aluminum material. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si.

In the present embodiment mentioned above, there is shown the example in which the divided surface of the sector 5 is formed by the flat surface, however, the present invention is not limited to this, but the sector 5 may be divided into curved surfaces. FIG. 5 is an expansion plan view showing a tread forming surface in a mold clamped state, and shows an example in which divided surfaces D of a pair of adjacent sectors 5 are formed by the curved surface, by employing a piece 53 in place of the piece 52 mentioned above.

In a case where the sector 5 is divided into the curved surfaces as mentioned above, a freedom of the division surface D is widely increased in comparison with the division into the flat surfaces. Accordingly, it is possible to employ the division surface D having a preferable layout in a relation to the tread forming surface 1a. In other words, it is preferable that the division surface D of the sector 5 does not interfere with a sipe blade 17 or a vent hole (not shown) arranged in the concave portion 16, and it is preferable that the division surface D does not extend in the longitudinal direction on the frame portion 15, however, it is possible to preferably employ the preferable layout mentioned above, by dividing the sector 5 into the curved surfaces.

In the present invention, since the interface of a pair of adjacent pieces 53 constructs the division surface D, it is possible to apply the curved surface division by setting the piece 53 which is light and thin in comparison with the sector 5 corresponding to the heavy material to the subject to be processed. Therefore, it is possible to work by a compact working machine which has been hard conventionally, and it is easy to handle, whereby workability is improved.

The present invention is not limited to the embodiment mentioned above, but can be improved and modified variously within the scope of the present invention. Accordingly, it is possible to appropriately change, for example, the shape and the material of the sector, the concavo-convex shape of the tread forming surface, the opening and closing mechanism of the forming mold and the like.

Figure 6:
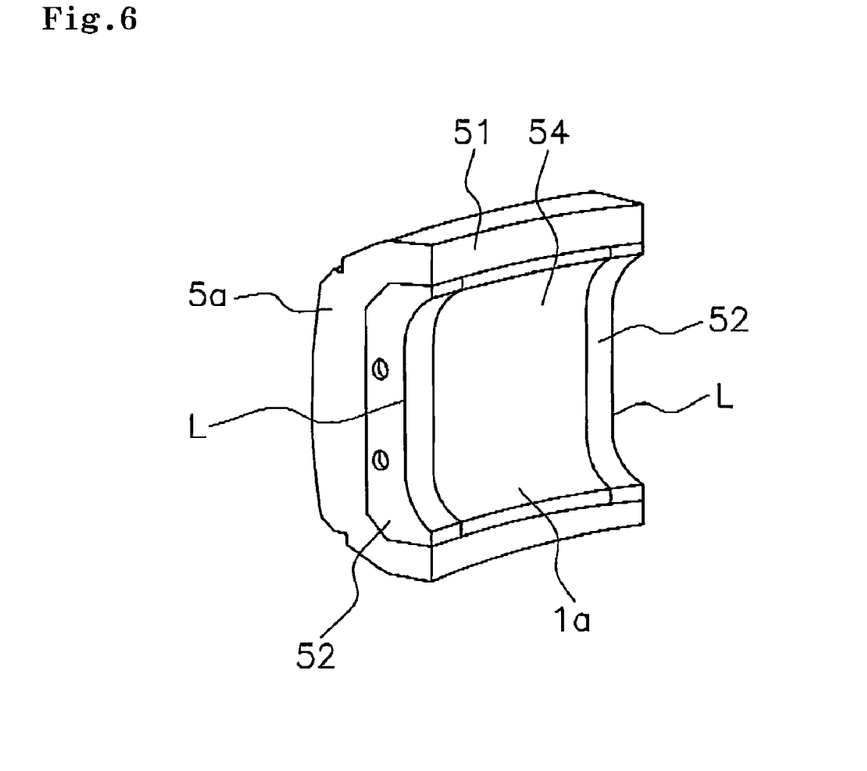
FIG. 6 is a perspective view of a sector in accordance with the another embodiment of the present invention.
Figure 7:
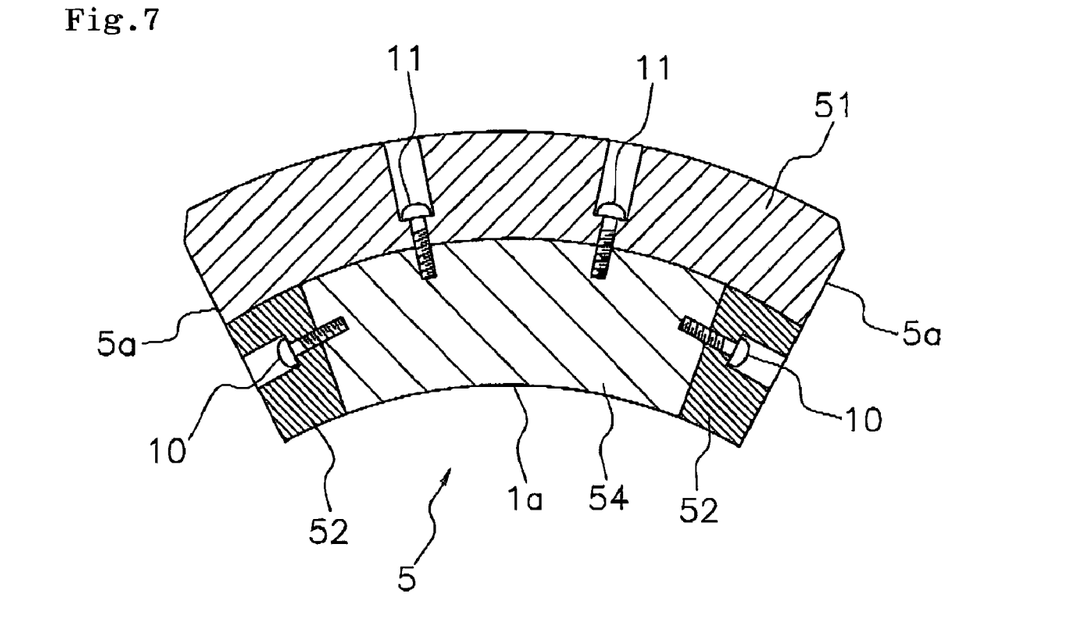
FIG. 7 is a cross sectional view of the sector shown in FIG. 6.

FIG. 6 is a perspective view of a sector in accordance with the another embodiment of the present invention. FIG. 7 is a cross sectional view of the sector shown in FIG. 6. The same reference numerals are attached to the same members and positions as the members and positions described in the embodiment mentioned above, and an overlapping description will not be repeated.

In a sector 5 shown in FIGS. 6 and 7, a segment 54 is detachably mounted to an inner peripheral side of a sector main body 51 having a case structure by a bolt 11, and pieces 52 are attached to both sides thereof. A tread forming surface 1a is constituted by an inner peripheral surface of the segment 54 and an inner peripheral surface of the piece 52.

In the sector main body 51 having the case structure, a raw material (for example, a steel material) which is harder than the aluminum material is preferably used. Accordingly, it is possible to receive a surface pressure applied to an end surface 5a of the sector 5 to some extent by the sector main body 51, and it is possible to reduce a surface pressure applied to the piece 52. Therefore, it is possible to suppress the attrition of the piece 52 so as to extend a service life (a replacement cycle).

Figure 8:
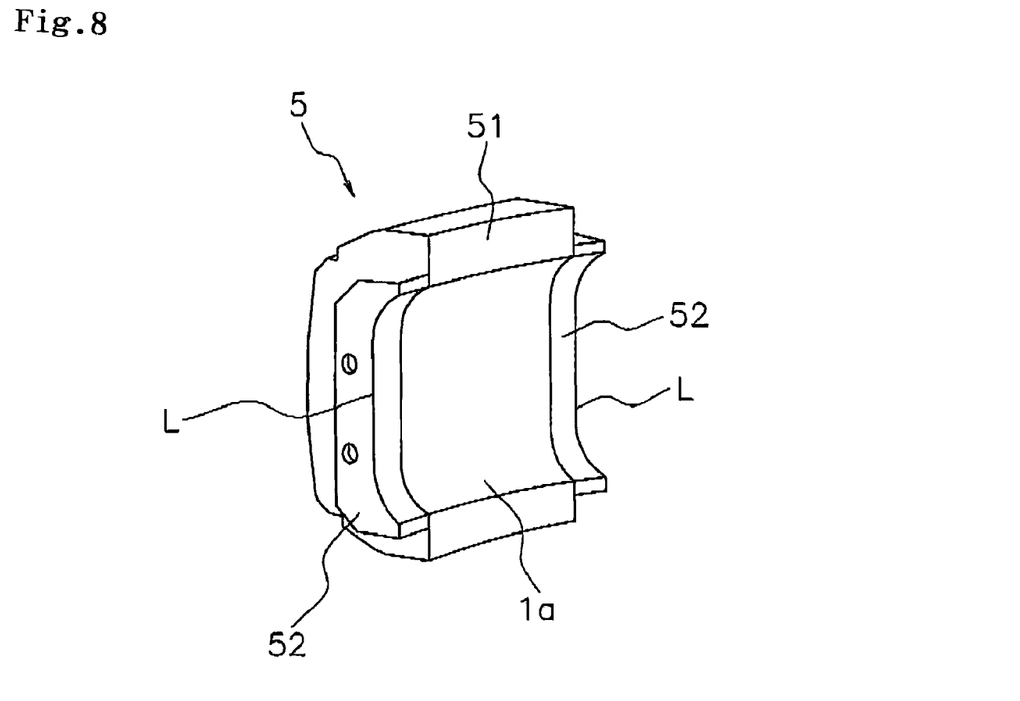
FIG. 8 is a perspective view of a sector in accordance with the another embodiment of the present invention.
Figure 9:
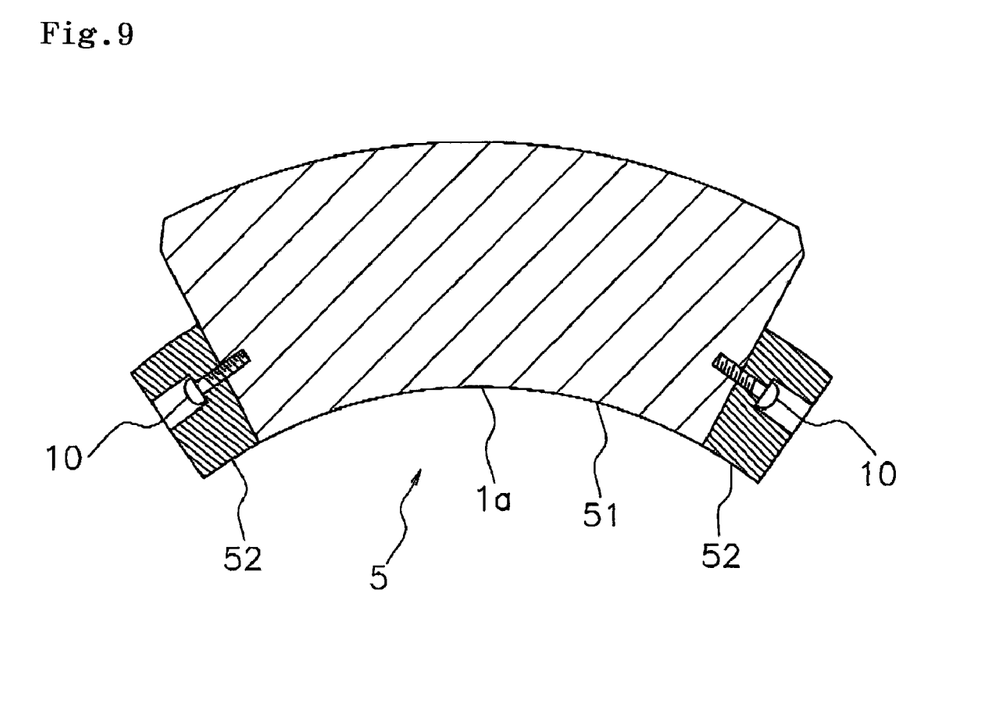
FIG. 9 is a cross sectional view of the sector shown in FIG. 8.

FIG. 8 is a perspective view of a sector in accordance with the another embodiment of the present invention. FIG. 9 is a cross sectional view of the sector shown in FIG. 8. The same reference numerals are attached to the same members and positions as the members and positions described in the embodiment mentioned above, and an overlapping description will not be repeated.

In a sector 5 shown in FIGS. 8 and 9, the pieces 52 are attached to both end portions of the sector main body 51 in such a manner as to protrude, and the piece 52 is not fitted to the concave portion of the sector main body 51 as is different from the embodiment mentioned above. In this case, since it is not necessary to work for forming the concave portion in the sector main body 51, it is possible to suppress a working cost.

EXAMPLES

In order to specifically show the structure and the effect of the present invention, a generation condition of a flash is compared between a conventional forming mold (Comparative Example) in which each of the sectors is integrally provided, and a forming mold (Example) in which an end portion of each of the sectors has the piece structure mentioned above, by using segmented type forming mold curing forming a pneumatic tire having a tire size 215/60R16. The tires corresponding to the comparison subject are taken out from about 30000 cured tires, however, in the Example, the tires are taken out after the piece is replaced.

Taking out twenty-four tires in each of the Comparative Example and the Example, and carrying out an outer appearance observation of the tire and a measurement of the uniformity, a generation of the flash is confirmed, and an average value of a radial force variation (RFV) is 7.0 kgf, in the Comparative Example. However, the flash is not generated and the average value of the RFV is 6.5 kgf, in the Example. The uniformity is comparatively worse in the Comparative Example because it is considered that a circumferential rubber weight distribution of the tread surface becomes uneven due to the generation of the flash, and the Example can suitably cope with the attrition of the end surface of the sector.

In this case, the RFV mentioned above is measured on the basis of a test method defined in JISD4233. Specifically, a fluctuation amount of a reaction force in a radial direction generated in the tire is measured by installing the tire to a rim having a rim width of 6.5 inch, setting a pneumatic pressure to 200 kPa, and rotating the tire in a state in which a load 530 kg is applied. Accordingly, the smaller the numerical value is, the smaller the fluctuation amount is, thereby obtaining an excellent uniformity.

What is claimed is:

1. A tire curing forming mold in which an annular mold portion brought into contact with a tread portion of a tire comprises a plurality of sectors divided in a tire circumferential direction, wherein each end portion of each sector includes a single piece attachable to and detachable from a sector main body, and the single piece includes all ridge lines between an end surface of the sector and a tread forming surface provided on an inner peripheral side of the sector, and further wherein the tread forming surface of the sector main body is a monolithically integrally formed surface.

2. A tire curing forming mold in which an annular mold portion brought into contact with a tread portion of a tire comprises a plurality of sectors divided in a tire circumferential direction, wherein each of end portions of a pair of adjacent sectors includes a single piece attachable to and detachable from a sector main body, division surfaces of the pair of the sectors are formed by a curved surface, and the single piece includes all ridge lines between an end surface of the sector and a tread forming surface provided on an inner peripheral side of the sector, and further wherein the tread forming surface of the sector main body is a monolithically integrally formed surface.

3. The tire curing forming mold according to claim 1, wherein each piece is projectingly attachable to and detachable from the sector main body.

4. The tire curing forming mold according to claim 2, wherein each piece is projectingly attachable to and detachable from the sector main body.

* * * * *